United States Patent [19]

Goertzen et al.

[11] 4,372,397
[45] Feb. 8, 1983

[54] GARDEN TILLER WITH EXTENDED TINE SHIELD

[75] Inventors: Gerold G. Goertzen, St. Anne; Lee R. Herscher, Kankakee, both of Ill.

[73] Assignee: Roper Corporation, Kankakee, Ill.

[21] Appl. No.: 248,872

[22] Filed: Mar. 30, 1981

[51] Int. Cl.³ .................. B62D 51/04; A01B 33/02
[52] U.S. Cl. .................................. 172/42; 172/112
[58] Field of Search .................. 172/42, 43, 112, 123

[56] References Cited

U.S. PATENT DOCUMENTS

| | | | |
|---|---|---|---|
| 1,333,543 | 3/1920 | Greene | 172/52 |
| 2,614,375 | 10/1952 | Calkins | 172/43 X |
| 2,617,341 | 11/1952 | Clayton | 172/43 |
| 2,657,620 | 11/1953 | Meeks | 172/112 |
| 2,691,928 | 10/1954 | Kelsey et al. | 172/42 |
| 2,765,157 | 10/1956 | Hanson | 172/42 X |
| 2,827,842 | 3/1958 | Peterson et al. | 172/42 |
| 3,375,764 | 4/1968 | Petersen | 172/43 X |
| 3,773,112 | 11/1973 | Zinck et al. | 172/42 |

FOREIGN PATENT DOCUMENTS

| | | | |
|---|---|---|---|
| 172222 | 8/1952 | Austria | 172/42 |
| 512817 | 10/1920 | France | 172/43 |
| 132236 | 9/1929 | Switzerland . | |

Primary Examiner—Richard T. Stouffer
Attorney, Agent, or Firm—Leydig, Voit, Osann, Mayer and Holt, Ltd.

[57] ABSTRACT

A walk-behind garden tiller having power driven ground wheels and a single row of tines which are driven at relatively high speed in a direction counter to that of the drive wheels such that during tilling the tines cut upwardly through the untilled soil at the working face with each pass of the tines penetrating and severing a relatively thin uniform layer of soil, resulting in improved power efficiency and easier control of the tiller when operating in adverse soil conditions. A tine shield overlies the tines for confining flying and turbulent soil during tilling to the immediate area about the tines. The tine shield has a forward extension which defines an extended cavity in front of the tines within which a quantity of partially tilled soil directed upwardly and forwardly by the counter-rotating tines can accumulate for re-working and more thorough pulverization by the tines as the machine proceeds along its forward movement. The illustrated shield extension terminates in a downwardly and forwardly tapered lip for directing such partially tilled soil impinging upon the underside of the shield extension onto a continuously formed mound of partially tilled soil in front of the tines.

12 Claims, 16 Drawing Figures

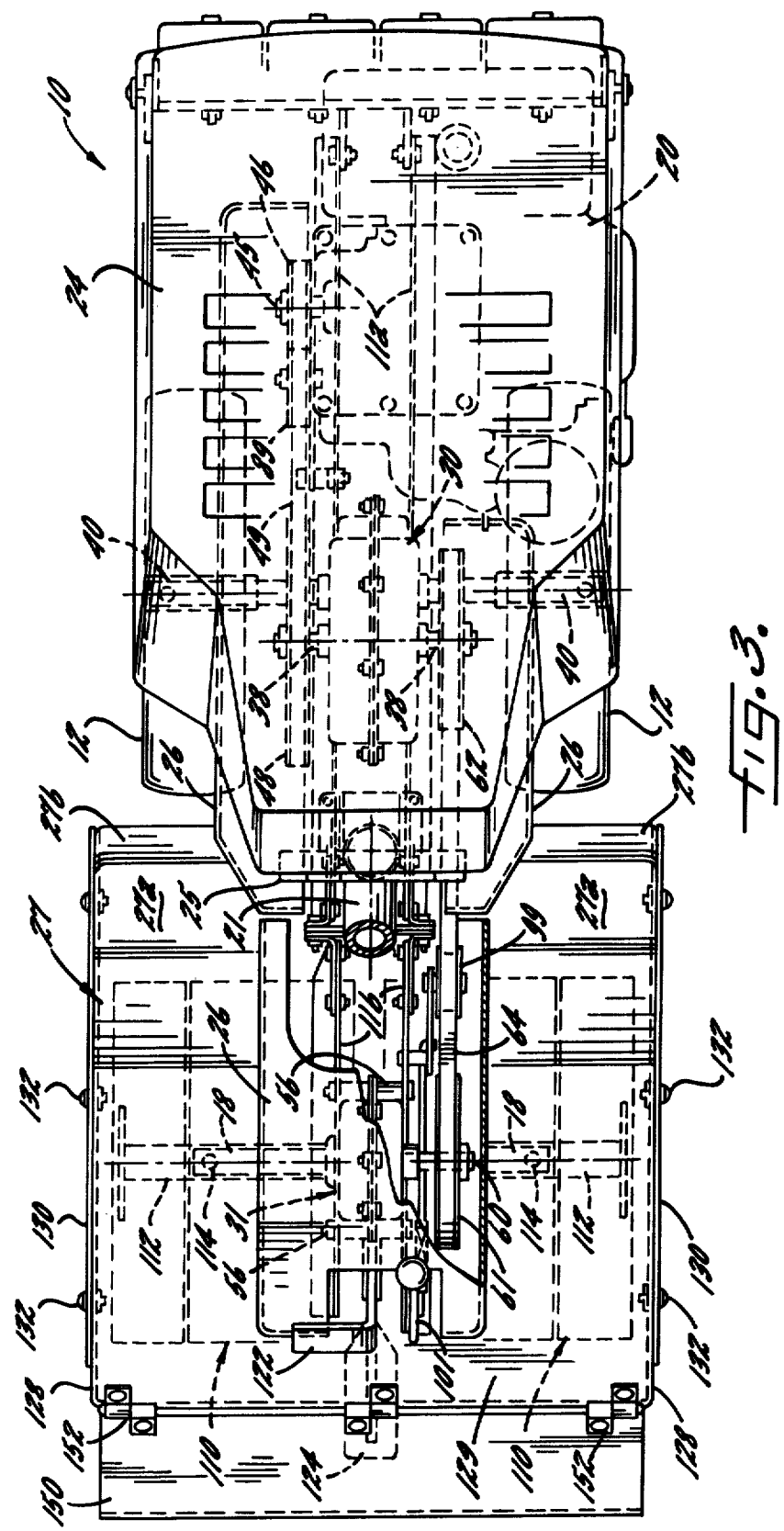

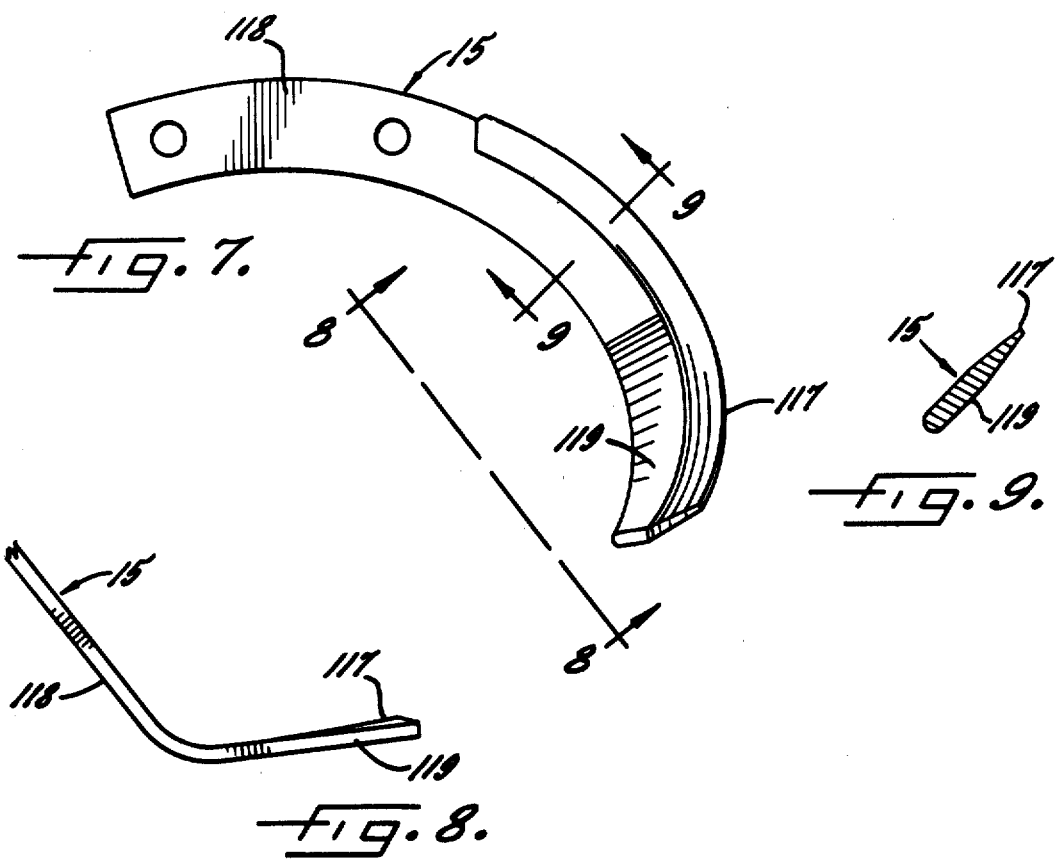
fig. 7.
fig. 9.
fig. 8.
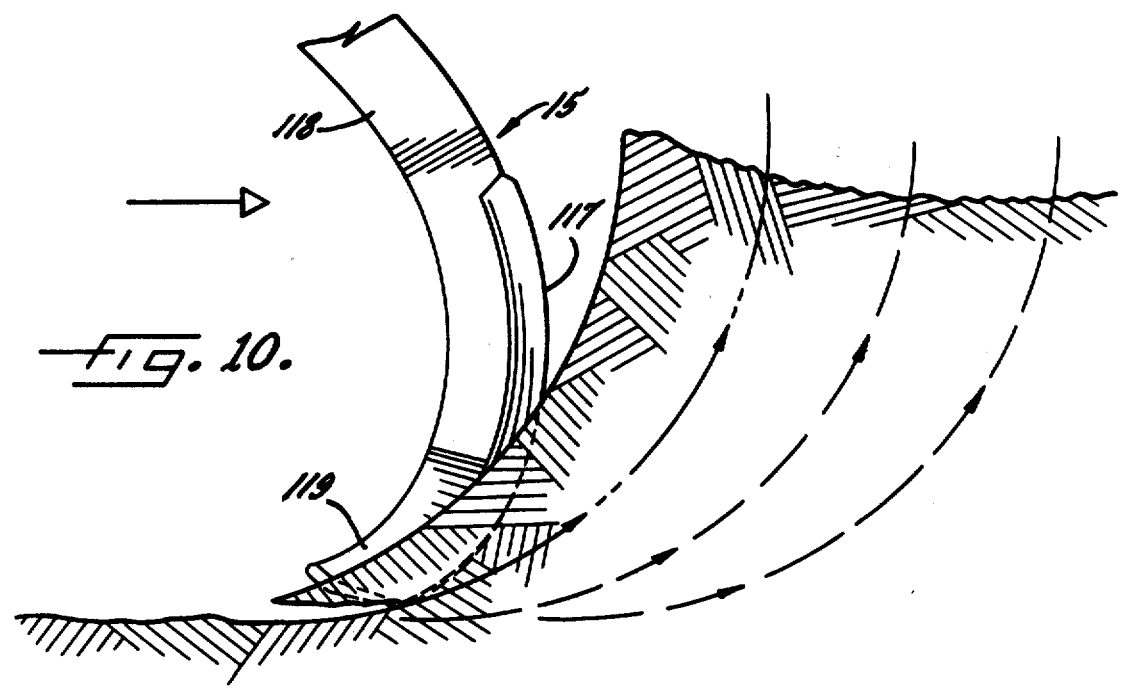
fig. 10.

GARDEN TILLER WITH EXTENDED TINE SHIELD

DESCRIPTION OF THE INVENTION

The present invention relates to power operated soil tilling machines, and more particularly, to soil tilling machines of the type that are manually manipulated and controlled by a person walking with or behind the machine.

Manually operated soil tilling machines of the type which are intended for garden usage commonly comprise a frame having driven ground wheels and a single row of power driven tines for penetrating and pulverizing the earth. The tine shaft of such manually operated tilling machines typically is driven in the same rotary direction as the ground wheels such that upon forward movement of the machine the tines will successively contact the top of the ground and penetrate successive layers of earth in the direction of machine movement.

Such conventional single tine shaft tilling machines frequently are difficult for the operator to manipulate and control, particularly when tilling very hard ground or soil which includes significant foreign materials or obstructions. Because the tines are rotating in the same direction as the ground wheels, when an obstruction is contacted, the tines tend to hook onto the obstruction, lunge forward and continue running forward, in effect, climbing out of the ground from their tilling depth. Moreover, because the tines in such conventional tilling machines engage the top of the soil, and in effect compress it during penetration, considerable power is expended during tilling. Since power capabilities usually are limited in walk-behind type tilling machines, such machines often incur difficulties in effectively penetrating and pulverizing hard ground and other adverse soil conditions to a normal tilling depth in a single pass of the machine.

It is an object of the present invention to provide a manually operated, walk-behind, type soil tilling machine that is adapted to till and thoroughly pulverize greater quantities of soil per unit of time and with improved power efficiency as compared to conventional tilling machines.

Another object is to provide a tilling machine of the foregoing type that is capable of tilling and thoroughly pulverizing earth to greater depths in a single pass than has heretofore been possible with usual power limitations of manual walk behind tilling machines.

A further object is to provide a tilling machine as characterized above which is adapted to confine and direct soil during tilling in a manner that enhances pulverization thereof.

Yet another object is to provide a tilling machine of the above kind that is adapted to direct partially tilled soil onto a continuously formed mound immediately in front of the power driven tines such that it can be reworked and more thoroughly pulverized by the tines as the machine proceeds along its forward movement.

Still a further object is to provide a manually operated, walk-behind, type soil tilling machine of the foregoing type that is easier and safer to use.

Other objects and advantages of the invention will become apparent upon reading the following detailed description and upon reference to the drawings, in which:

FIG. 3 is an enlarged top view of the illustrated machine;

FIG. 4 is an enlarged fragmentary section taken axially through the single tine shaft of the illustrated machine;

Figure 11:
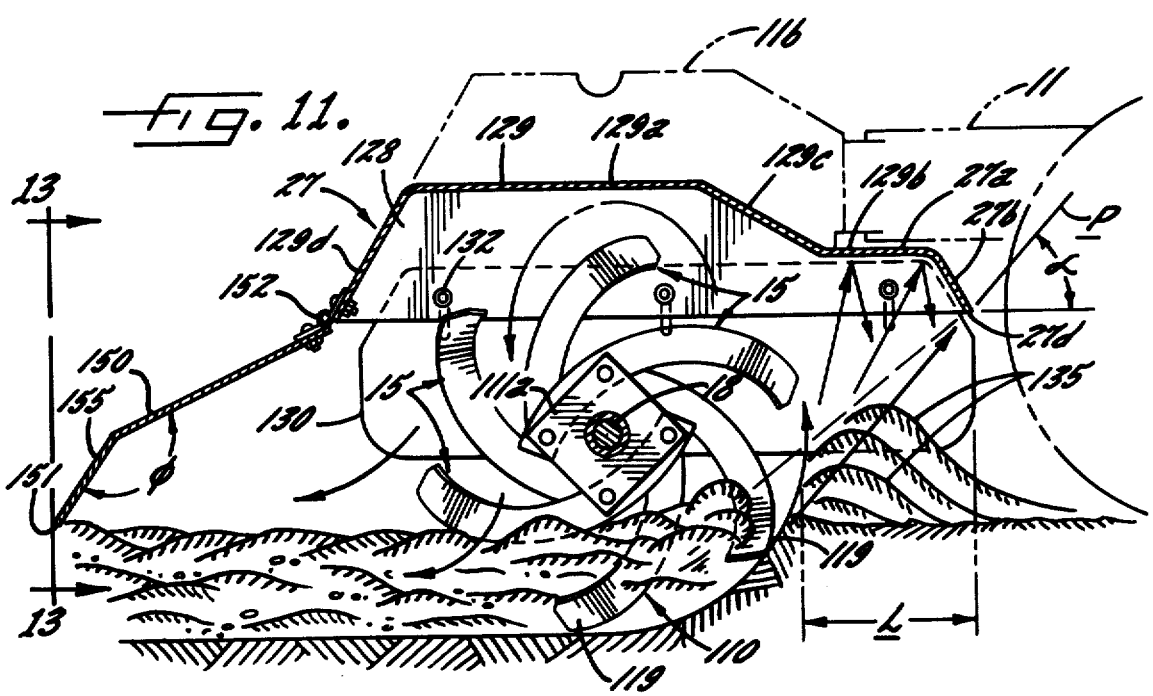
Figure 12:
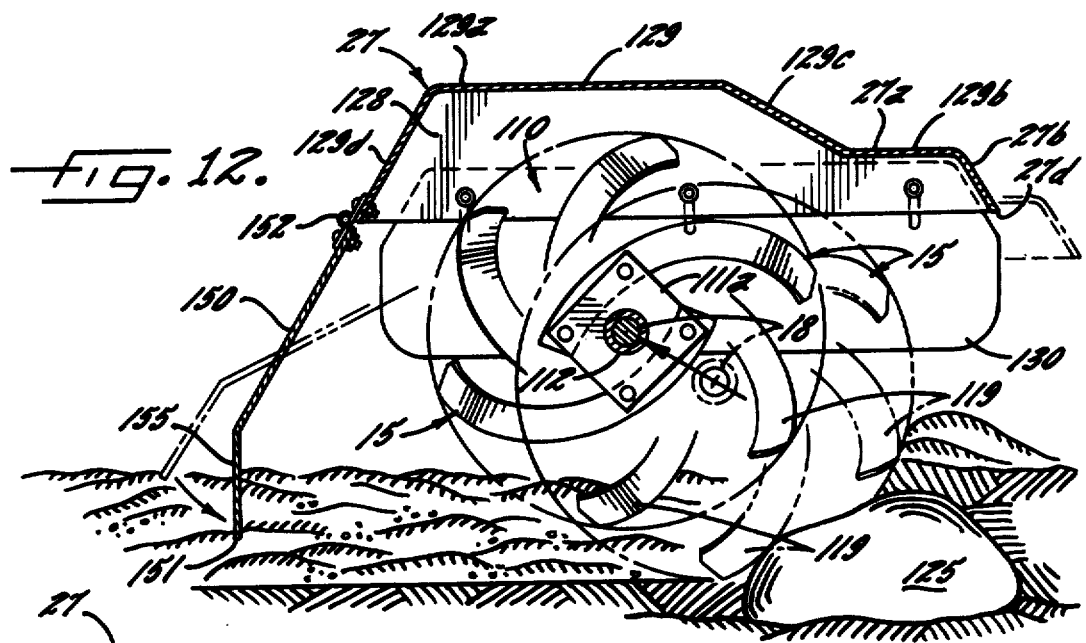
Figure 13:
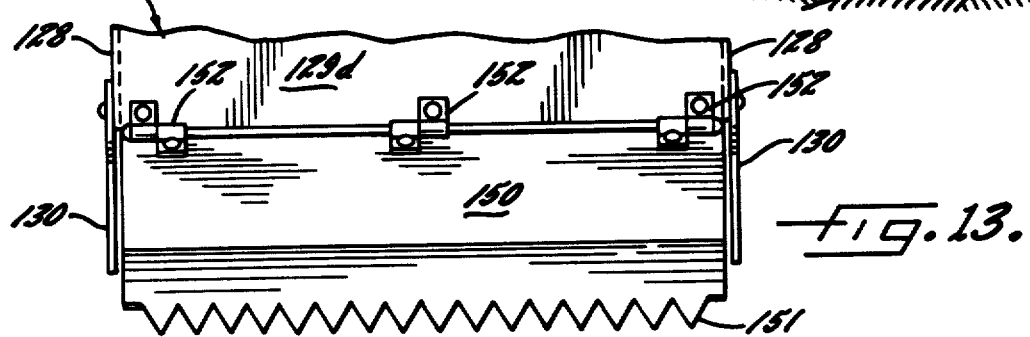
Figure 14:
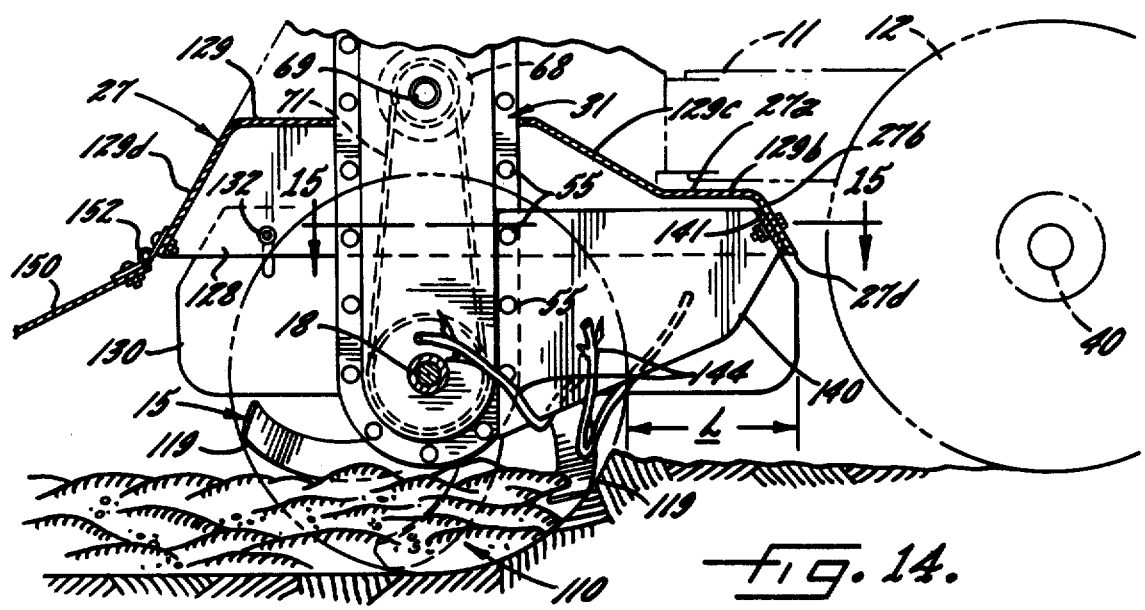
Figure 15:
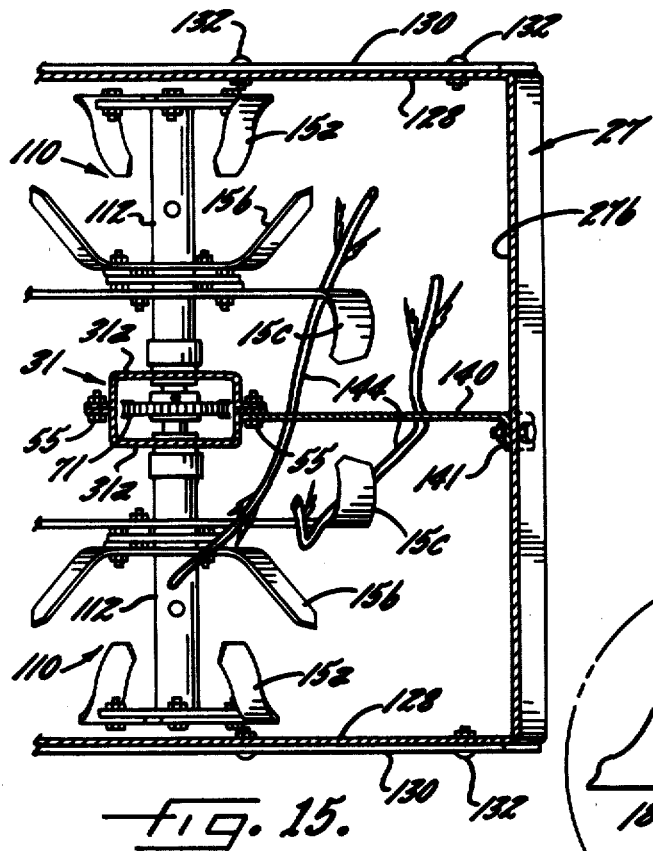
Figure 16:
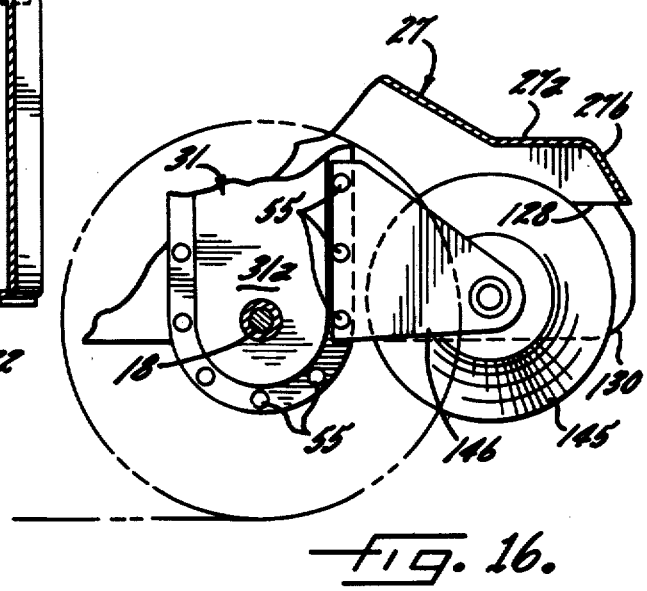

FIGS. 5 and 6 are vertical sections taken in the planes of lines 5—5 and 6—6, respectively, in FIG. 4;

FIG. 7 is an enlarged view of one of the tines of the illustrated machine;

FIG. 8 is a plan view of the tip of the tine shown in FIG. 7 taken in the plane of line 8—8;

FIG. 9 is a section of the tine shown in FIG. 7 taken in the plane of line 9—9;

FIG. 10 is a diagrammatic illustration of the soil penetrating and cutting action of one of the tines of the illustrated machine;

FIG. 11 is a vertical section through the tine drive shaft and tine shield illustrating tilling during normal operating conditions;

FIG. 12 is a vertical section, similar to FIG. 11, but illustrating the action of the machine upon contact with an obstruction;

FIG. 13 is a plan view of the extended drag shield of the machine taken in the plane of line 13—13 in FIG. 11;

FIG. 14 is a vertical section through the tine drive shaft showing the operation of the machine when engaging long vegetation and illustrating the action of a divider shield or sloughing member of the machine upon such vegetation;

FIG. 15 is a fragmentary section taken in the plane of line 15—15 in FIG. 14; and FIG. 16 is a vertical section, generally similar to FIG. 14, but showing an alternative form of divider shield or sloughing member.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the invention is to cover all modifications, alternative constructions and equivalents falling within the spirit and scope of the invention.

Referring now more particularly to the drawings, there is shown an illustrative soil tilling machine 10 embodying the present invention. The illustrated tilling machine 10 includes an elongated frame 11 supported for rolling movement by a pair of ground wheels 12, a single row of ground penetrating and pulverizing tines 15 mounted on a tine axle or shaft 18 located rearwardly of the ground wheels 12 and transversely to the line of machine movement, an internal combustion engine 20 mounted on a forwardmost end of the frame 11 for rotatably driving the ground wheels 12 and tines 15, and a vertically and transversely pivotable handle 21 extending rearwardly of the frame 11 for enabling a user to operate the machine while walking from behind or either side. The machine 10 in this instance includes a hood 24 pivotably mounted at 25 to permit access to the engine, a transmission and body cover 26 located below and generally rearwardly of the hood 24, and a tine shield 27 located below the rearward end portion of the transmission and body cover 26.

Figure 2:
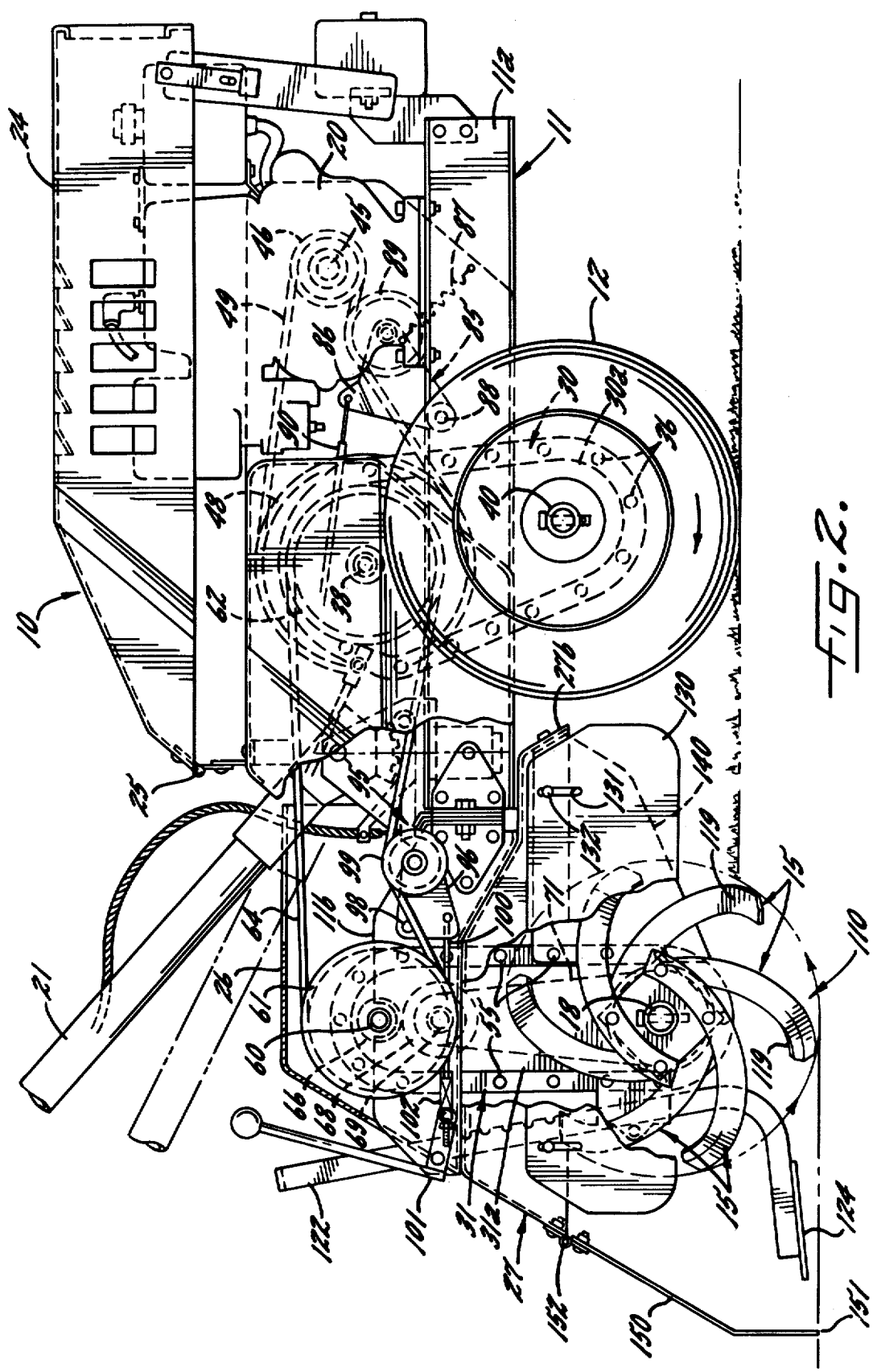
FIG. 2 is an enlarged side elevation view of the illustrated tilling machine.

The machine frame 11 comprises a pair of transversely spaced, generally horizontally disposed supports 11a between which are mounted a ground wheel transmission 30 and a tine transmission 31 which serve to support the respective ground wheels 12 and tines 15 in depending fashion below the frame 11 and transmit power thereto from the engine 20, as best shown in FIGS. 2 and 3. The engine 20, which typically may be a four-cycle gasoline powered internal combustion of between about five and eight horsepower, is mounted on the forwardmost end of the frame supports 11a. The ground wheel transmission 30 includes a two-part sealed housing 30a secured together by bolts 36. The transmission 30 has an input shaft 38 rotatably carried in an upward portion of the housing 30a above the frame 11 and a ground wheel axle 40 carried in a lower portion of the transmission housing below the frame. The input shaft 38 is coupled to an output shaft 45 of the engine 20 by respective sheaves 46, 48 and a drive belt 49. It will be understood that the transmission 30 may be of a known type which permits selective driving of the ground wheels at one or more forward speeds, or in a reverse direction, when the transmission input shaft 38 is driven by the engine. Thus, the engine 20 is adapted to power the ground wheels 12 through the transmission 30 to move the machine 10 along a track that is to be tilled by the tines 15.

In keeping with the invention, the tines are driven at a relatively high speed in a direction counter to that of the ground wheels such that during normal forward movement of the machine during tilling the tines penetrate and cut upwardly through the untilled soil at the working face in relatively shallow discrete layers and with substantially reduced power requirements than heretofore necessary for conventional tilling machines that operate in a downwardly directed ground engaging manner. In the illustrated embodiment, power is transmitted to the tine axle 18 through the tine transmission 31, which like the ground wheel transmission 30, comprises a two-part sealed housing 31a secured together by bolts 55. An upper portion of the transmission housing 31a is mounted between the frame supports 11a by bolts 56, and a lower portion of the housing 31a extends below the frame supports 11a and rotatably carries the tine axle 18.

For driving the tine transmission 31, as best shown in FIGS. 2 and 4, the housing 31a carries a rotatable input shaft 60 which is operatively connected to the input shaft 38 of the ground wheel transmission by means of a sheave 61 mounted on the tine transmission input shaft 60, a belt 64, and a sheave 62 mounted on the ground wheel transmission input shaft 38. Input shaft 60 for the tine transmission 31 carries a pinion 66, disposed within the transmission housing 31a, which drives a gear 68 on an intermediate tine transmission shaft 69 rotatably carried by the housing 31a. The intermediate shaft 69 is operatively connected to the tine axle 18 through a sprocket driven chain 71.

By virtue of such power transmission arrangement, with both the wheel and tine transmissions 30, 31 operatively engaged, when the engine 20 drives the ground wheel transmission input shaft 38 in one direction, the wheel axle 40 and tine transmission input shaft 60 are driven in the same rotary direction, while the intermediate tine transmission shaft 69 and tine axle 18 are driven in an opposite rotary direction. Accordingly, when the tilling machine is driven in a forward operating direction, the wheels 12 rotate in a clockwise direction, as viewed in FIG. 2, while the tines are rotated in an opposite counterclockwise direction. It will be understood by one skilled in the art that the relative rotary speeds of the ground wheel and tine axles 40, 18, and thus the peripheral speeds of the ground wheels 12 and tines 15, can be selectively established for a given engine output r.p.m. by appropriate design of the drive train and transmissions.

Figure 1:
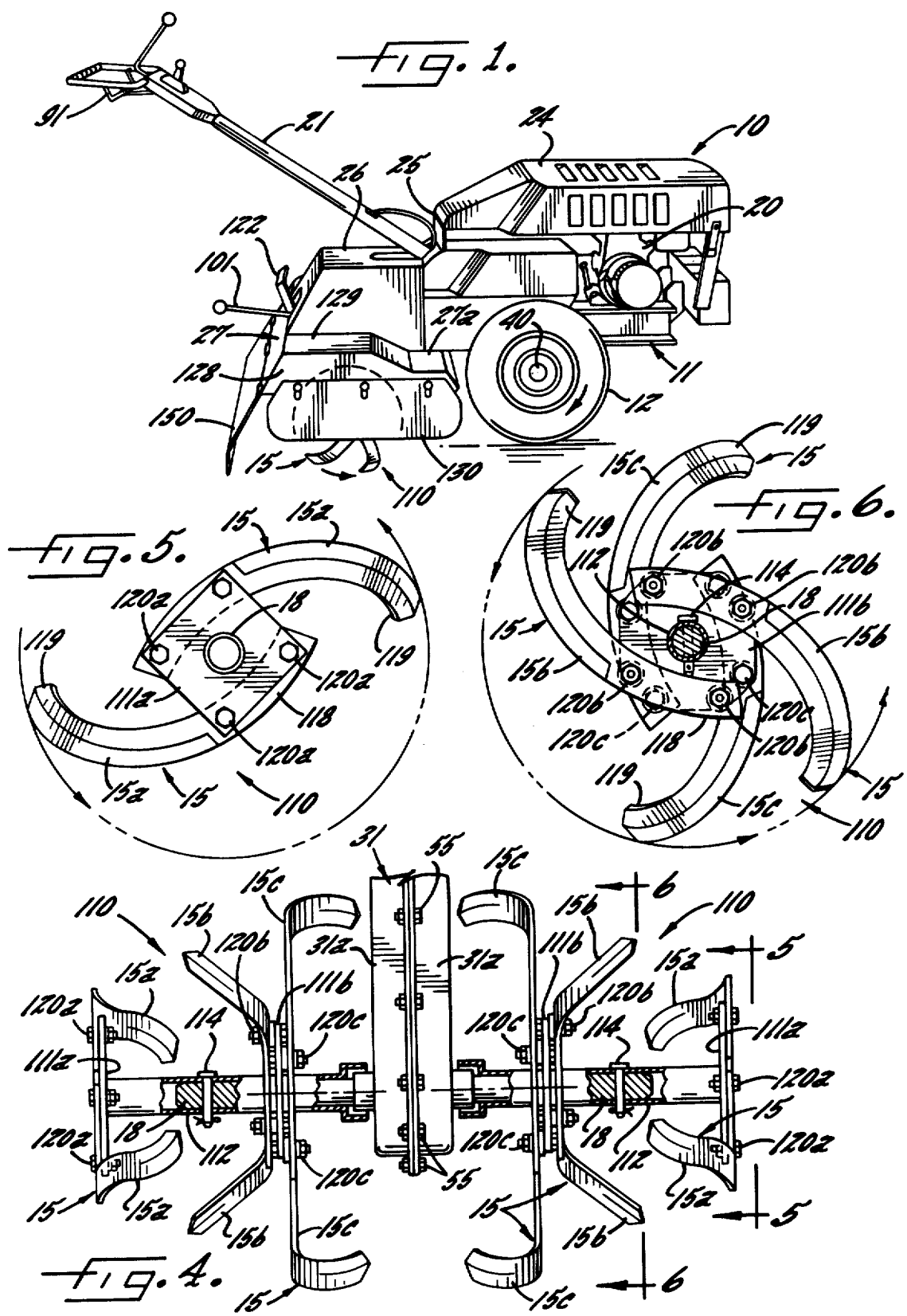
FIG. 1 is a perspective of an illustrative soil tilling machine embodying the present invention.

To permit selective engagement and disengagement of the tine and the ground wheel transmissions 30, 31 with the engine 20, a clutch 85 is provided, as shown in FIG. 2. The clutch 85 includes a bell crank 86 that is pivotably mounted on the machine frame at 88 and carries an idler pulley 89 at one end thereof for engagement with the belt 49 connecting the engine drive shaft 45 and the input shaft 38 for the ground wheel transmission 30. The bell crank 86 is biased toward a clutch disengaging position in which the idler pulley 89 is disengaged from the belt 49 by a spring 87 extending between the pinion carrying end of the bell crank 86 and the machine frame. A clutch cable 90 extends from another end of the bell crank 86 to a clutch layer 91 (shown in FIG. 1) pivotably connected to the underside of the handle 21 for easy access by the operator. By moving the clutch lever 91 in a direction toward the underside of the handle 21, the clutch cable will pivot the bell crank against the biasing force of the spring 87 in a counterclockwise direction, as viewed in FIG. 2, causing the idler pulley 89 to be moved to a position tightening the drive belt 49 sufficiently to drive the ground wheel transmission input shaft 38, and thus the tine transmission input shaft 60 connected thereto through the belt 64. Upon release of the clutch lever 91, whether intentionally or in the event that an operator should stumble or otherwise lose control of the machine, the bell crank 86 will be pivoted, under the biasing force of the spring 87, to a position disengaging the idler pulley 89 from tightening relationship with belt 49, thereby interrupting the drive to the ground wheels and tines.

In order to permit selective disengagement of the tine transmission 31, while the ground wheel transmission 30 continues to be driven by the engine 20, a separate tine transmission clutch 95 is provided, as also shown in FIG. 2. The tine transmission clutch 95 includes a bell crank 96 that is pivotably mounted on the machine frame at 98 and carries an idler pulley 99 for engagement with the belt 64 coupled between the input shafts 38 and 60 for the ground wheel and tine transmissions 30, 31, respectively. For selectively pivoting the bell crank 96, a clutch rod 100 is connected between the bell crank 96 and an over center clutch actuating handle 101 through a spring loaded connection 102. By pivotal movement of a tine transmission clutch handle 101 in a clockwise direction, as viewed in FIG. 2, it can be moved beyond a center position which causes counterclockwise pivoting of the bell crank 96 moving the idler pulley 99 into a belt tensioning and clutch engaging position. For disengaging the clutch, the handle 101 is moved in a counterclockwise direction, as viewed in FIG. 2, beyond its center position and pivots the bell crank 96 in a clockwise direction, relieving the tension on the drive belt 64 and interrupting the drive to the tine transmission input shaft 60.

Mounted upon the tine axle 18 on opposed sides of the tine transmission housing 31a in the illustrated machine, as best shown in FIGS. 4-10, are similar tine assemblies 110, each including three axially spaced pairs of 180° out-of-phase tines 15, each pair being 60° out-of-phase from the other pairs. The tines 15 of each pair are secured to a respective transverse tine plate 111 mounted on a tine assembly hub 112, which in turn is fitted over the respective end of the tine axle 18 and secured to the axle by a pin 114. The tines 15 preferably are of a hoeing type, each having a base portion 118 that is curved in a retreating or opposite direction to that in which the tine assembly is rotated and a tip portion 119 that is bent laterally to the base portion 118 at the distal end thereof. The tip portion 119 of each tine in this case has a generally tapered portion 117 forming the leading cutting edge of the tine.

The illustrated tine assemblies 110, as shown in FIG. 4, each include a pair of outermost tines 15a secured at their base 118 to an outer tine plate 111a by bolts 120a such that the tip portions 119 are directed laterally inwardly, a pair of intermediate tines 15b secured to an intermediate base plate 111b by bolts 120b with the cutting tips thereof directed laterally outwardly, and a pair of innermost tines 15c also secured to the tine plate 111b by bolts 120c such that the tip portions thereof are disposed laterally inwardly. It will be appreciated that because the intermediate and innermost tines 15b, 15c of each assembly 110 are mounted on the same base plate 111b, they in effect form and operate as a single four-tang tine, and alternatively, such a tine could be employed. For balancing the reaction forces on the tine axle 18 during tilling, the tine assemblies 110 are similarly positioned on the opposed ends of the tine axle such that the outermost tines 15a simultaneously contact the soil, as do the intermediate tines 15b and the innermost tines 15c.

The tine assemblies 110 preferably are supported by the tine transmission housing 31 such that the depth of tine penetration during normal tilling (i.e.—with the machine frame 11 horizontally oriented) is between about three inches and five inches depending upon the horsepower capability of the machine. In practice, it has been found that with a six-horsepower tilling machine embodying the invention efficient tilling is obtained with tines having an effective cutting tip diameter of 12" and disposed such that they project about 3" below the lowermost level of the ground wheels when the machine frame 11 is in its normal horizontal position. In an eight-horsepower tilling machine with tines having a cutting tip diameter of 14" efficient tilling has been achieved with the tines disposed for a normal cutting depth of about 4" below the lowermost level of the ground wheels.

To permit selective adjustment in the vertical position of the rear of the machine frame during tilling, and thus, depth to which soil is tilled, a depth control guide 122 (shown in FIG. 2) is secured to the rear of the machine frame for selective vertical adjustment. The guide 122 has a glide plate 124 at its lower end that normally rests on the top of the tilled soil so that the rear of the tiller is supported at a predetermined height for the desired depth of tine penetration.

With the tines driven in a rotary direction counter to that of the ground wheels during tilling, as illustrated in FIG. 11, it can be seen that as the machine moves forward, the tip portions 119 of the tines 15 contact and penetrate the soil at the working face in an upward sweeping motion that tends to lift and loosen the soil even before the cutting and penetration is completed. In contrast, in conventional machines in which the tines are operated in an opposite downwardly directed soil penetrating mode, the tines tend to compress and compact the soil during the downward shearing and penetrating movement of the cutting tips, which causes greater resistance to tine penetration and necessitates greater power requirements. Hence, in practice the illustrated tilling machine with the counter-rotating tine movement has permitted improved power efficiency, with significantly greater quantities of soil being tilled per unit of time for given power limitations.

Moreover, because of the upward and forward cutting action of the tines 15, the reaction forces acting on the machine during tilling are generally downwardly and rearwardly directed. As a result, during normal tilling operations, when the tines engage harder soil conditions, the tines tend to dig more aggressively and to move slightly rearwardly so as to reduce the depth of the cut, thereby enabling the operator to maintain control of the machine with relative ease. It will be understood, however, that if the ground wheel drive is geared to pull the machine forward faster than earth can be effectively penetrated in front of the tines, slippage of the power driven ground wheels will occur, resulting in wasted energy and lower power efficiency, and in some instances, also causing the ground wheels to dig down or creep to the side, hampering the handling ability of the machine. On the other hand, if forward movement of the machine is too slow, the tines will be digging less dirt than ideal, and hence, also reducing efficiency.

The tines preferably are driven at a relatively high speed, as compared to conventional tilling machines, during normal forward tilling movement of the machine such that relatively thin, but yet discreet, layers of earth are penetrated and severed during each upward passage of a tine across the working face of the soil. More particularly, in practice, optimum effectiveness and efficiency has been achieved when the tine peripheral speed is at least eleven times the ground speed, and preferably, when the ratio of such tine peripheral speed and ground speed is within the range of about 11 to about 15 and most preferably when the ratio is at least 12. It will be understood that such relationship between the tine speed and ground speed is during low gear, forward movement of the ground wheels since tilling is ordinarily done in the low gear, while high gear operation generally is used only for cultivating or transporting of the tiller.

In practice, effective tilling has been efficiently achieved in a six-horsepower tiller embodying the present invention having an engine operating speed of 3400 r.p.m. which drives 16" diameter ground wheels at 16 r.p.m. in low gear (i.e.—for a ground wheel peripheral speed of 67' per minute) and which drives 12" diameter tines at 260 r.p.m. (i.e.—for a tine peripheral speed of 817' per minute). The ratio of the tine peripheral speed to ground wheel peripheral speed in such case is 12.2. Similar effectiveness and efficiency in tilling has been achieved with an eight-horsepower tiller having an engine operating speed of 3400 r.p.m. which again drives 16" drive wheels at 16 r.p.m. (i.e.—for a ground wheel peripheral speed of 67' per minute) and drives 14" diameter tines at an r.p.m. of 260 (i.e.—for a tine peripheral speed of 953' per minute). The ratio of tine peripheral speed to ground peripheral speed in such eight-horsepower tiller is 14.2. Each of the foregoing machines embodying the present invention were found to operate with significantly improved power efficiency, tilled greater quantities of soil per unit of time, and tilled to greater depths in a single pass of the machine than heretofore available with comparably powered single tine shaft tillers.

The tilling machine 10 further has been found to till more effectively and be easier to manipulate in adverse soil conditions, such as in hard or rocky ground. As illustrated in FIG. 12, when a tine 15 engages an obstruction, such as a rock 125, during tilling the tiller will tend to move rearwardly a slight distance (from the phantom line to solid line position shown in FIG. 12), by virtue of the reactive forces acting on the machine and then forward again due to the effect of the ground wheels until the next tine strikes the obstruction, whereupon the tiller will again move back a small distance. Such vibratory action will continue until the obstruction is either removed by the tines or the tiller is stopped or otherwise traversed around the obstruction. In contrast, in conventional tillers having tines that are rotated in a downwardly directed soil penetrating and cutting mode, when the tines are unable to penetrate an obstruction or hard soil condition the tines tend to hook on to the obstruction and cause the tiller to lunge forward and continue to run forward, in effect, climbing out of the tilling trench. Thus, the tilling machine of the present invention with the counter-rotating tines also has been found to be more easily controllable and safer to operate in such adverse soil conditions.

For protecting the operator from the tines and for providing a semi-enclosure for confining flying and turbulent soil during tilling, the tine shield 27 has a hood type configuration and is secured to the underside of the frame 11 directly beneath the rear transmission and body cover 26 such that it is in overlying relation to the tines 15. The tine shield 27 includes opposed sides 128 and a top 129 formed with a suitable aperture through which the tine transmission housing 31 extends. Vertically adjustable side panels 130 are provided in depending fashion from the shield sides 128 to allow for selective positioning of the side panels in accordance with the depth of tilling desired. To permit vertical adjustment of the side panels 130, the panels are formed with vertically disposed elongated slots 131 and are secured to the shield sides 128 by appropriate fasteners 132 passing through the slots.

In accordance with the invention, for further enhancing pulverization of the tilled soil, the tine shield 27 has a forward extension 27a which defines an extended cavity or space in front of the tines to allow partially pulverized dirt directed upwardly by the counter rotating tines 15 to accumulate in a small mound so that it can be re-worked and more thoroughly pulverized as the machine proceeds along its forward movement. To facilitae the direction of flying dirt striking the shield extension 27a onto such mound in front of the tines, the tine shield extension 27a terminates in a forwardly and downwardly directed lip 27b. The top 129 of tine shield 27 in this case has a stepped configuration comprising a first substantially flat horizontal panel 129a above the tines, a second substantially flat horizontal panel 129b which forms part of the shield extension 27a and is disposed at a lower level than the first horizontal panel 129a, and an inclined panel 129c interconnecting the first and second horizontal panels. The lip 27b of the forward tine shield extension 27a extends downwardly and forwardly from the lower forward, horizontal panel 129b, while a rear lip or panel 129d extends downwardly and rearwardly of the horizontal panel 129a. The bends in the shield top 129 which define the several panels and lips preferably should be smoothly curved on the underside thereof so as to resist undesirable buildup of dirt in the interior corners of the shield. The tine shield 27 in this case is mounted with the stepped panels 129a, 129b, and 129c adjacent a similarly shaped vertical offset rear section 11b of the machine frame 11.

It will be appreciated that the shield extension 27a should extend forwardly and downwardly a sufficient distance so that it blocks most forwardly directed dirt during tilling, but yet be high enough above the ground to prevent dirt from building up below the shield and in effect the plugging of the machine. Preferably, the forward extension 27a of the tine shield 27 extends forwardly of the front periphery of the tines a distance "L" equal to about one-half the diameter of the tines and downwardly to a level of about one-third the tine diameter below the top periphery of the tines. It has been found that most forwardly and upwardly directed flying dirt will be blocked or appropriately directed by the tine shield extension if a lower leading edge 27d of the lip 27b lies in a plane "P" that is tangent to the outer periphery of the tine and at an angle $\alpha$ preferably of about 40° to the horizontal, but in no event, greater than 55° to the horizontal, as depicted in FIG. 11. The lower leading edge 27d of the tine shield extension lip 27b also preferably should not extend below the level of the axle 40 of the ground wheels 12 so that soil, vegetation, or other trash which pass under the ground wheel axle 40 will also pass under the leading edge of the shield 27. In practice, effective shielding and soil pulverization has been achieved in a tiller having 14" diameter tines with the tine shield 27 having an extension 27a extending a distance "L" of six inches forwardly of the front periphery of the tines 15, a horizontal extension panel 129b disposed about one inch below the top peripheral level of the tines, and a forward lip 27b disposed at an angle of 60° below the horizontal with the leading edge 27d thereof located three inches below the top periphery of the tines.

The effectiveness of such shield extension 27a during tilling is best illustrated in FIG. 11, where it can be seen that by virtue of the counter-rotating movement of the tines dirt is thrown upwardly in front of the tines with a portion dropping downwardly into the rotating tines where it is further pulverized, a portion is directed rearwardly of the tines, and a portion is directed upwardly and forwardly of the tines. The shield extension 27a tends to block the forwardly sprayed dirt with the lip 27b directing it onto a mound 135 of partially pulverized dirt immediately in front of the power driven tines 15. As the machine progresses in its forward movement, the tines will then re-work and further pulverize this mound 135 while continuing to form and accumulate a similar mound of partially pulverized dirt under the shield extension 27a directly in front of the power driven tines.

For the purpose of cutting and breaking down long vegetation that might exist on or in the ground being tilled and to prevent such vegetation from accumulating about the tine transmission housing or entangling about the rotary hub of the tine assemblies 110, a sloughing member 140 is mounted forwardly of the tines between the lower portion of the tine transmission housing 31a and the lip 27b of the tine shield extension 27a, as illustrated in FIGS. 14 and 15. The sloughing member 140 in this case consists of a flat plate mounted in a vertical plane on the longitudinal axis of the machine forwardly of the tine transmission housing 31a. One end of the plate 140 is secured to the tine transmission housing 31a by the transmission housing bolts 55 and the other end of the plate is formed with a flange 141 that is bolted to the underside of the tine shield lip 27b.

By virtue of the counter-rotating movement of the tines, it can be seen in FIGS. 14 and 15 that long vegetation 144, such as weeds, stalks, or the like, will be swept upwardly by the tines 15 during tilling. As the tines lift such vegetation into contact with the sloughing plate 140, the sloughing plate will tend to either cut the vegetation into smaller lengths or guide the vegetation downwardly and around the bottom of the transmission housing 31. In either case, the sloughing plate 140 prevents the vegetation from wrapping around the tine shaft or excessively accumulating around the transmission housing so as to otherwise impede effective tilling by the tines. With the long vegetation cut or broken down in size in such manner, it can then be more readily mixed and dispersed in the tilled soil.

An alternative form of sloughing means is illustrated in FIG. 16 and includes a disc 145 rotatably mounted in forwardly extended relation to the lower end of the transmission housing 31a. The illustrated disc 145 is mounted on a bracket 146 secured to the transmission housing by the transmission housing bolts 55. The disc 145 preferably should be disposed such that the lower periphery of the disc is located at or near the lower level of the transmission housing. During tilling, the sloughing disc 145 will function essentially the same as the plate 140 previously described by cutting or breaking down long vegetation which is carried upwardly by the tines into contact with the sloughing disc, as well as guiding such vegatation under and around the transmission housing 31a so as to prevent undesirable buildup or clogging of the tines.

For smoothing out the soil after it is tilled and for protecting the feet of an operator walking behind the machine from injury by the power driven tines, a drag shield 150 (FIGS. 11-13) is mounted on the rear of the machine and has a lower edge 151 that drags along the top of the tilled soil. The drag shield 150 in this instance is pivotably mounted on the rear panel 129d of the tine shield 27 by a hinge connection 152, and preferably, the ground engaging edge 151 is formed with a serrated configuration.

For further protecting the operator from injury and for enhancing controllability of the machine, the drag shield 150 has a length that is greater than the distance from its point of attachment on the machine to the lower peripheral level of the tines such that in the event the tines strike an obstruction that causes the machine to move rearwardly, the lower edge of the drag shield will anchor in the soil and by a lever-type pivoting movement about such anchor point will tend to raise the rear of the machine, thereby eliminating or reducing tine contact with the soil and the rearward thrust of the machine. To this end, the illustrated drag shield 150 has a lower portion 155 which is bent at an angle $\phi$ of about 150° such that it rides at a substantial angle with the tilled soil as the drag plate is pulled along. Such lower drag plate portion 155 tends to enhance raking and smoothing of the tilled soil, as well as insuring a firm anchor point in the event of sudden rearward machine movement.

Accordingly, if the tines engage an obstruction, as illustrated in FIG. 12, the resulting rearward movement of the machine by virtue of the reactive forces acting on the tines tends to anchor the serrated lower edge 151 of the drag shield 150 in the ground and pivot the drag shield 150 about such anchor point, with the hinge connection 152 permitting relative pivotable movement between the drag shield and the machine body. Since the drag shield 150 is longer than the distance between its hinged connection 152 with the machine and the lower peripheral level of the tines 15, such pivoted movement of drag shield 150 automatically tends to raise the rear of the machine slightly, thereby reducing or eliminating the tine engagement with the ground and the obstruction. When the obstruction is dislodged or otherwise traversed, and the ground wheels proceed to move the machine forwardly, the drag shield 150 will pivot forwardly about the anchor point in the ground, allowing the tines to resume their normal tilling depth. It will be apparent that at all times, whether during normal tilling or when the drag shield is anchored and pivoted to a tine disabling position, that the drag shield provides a complete and effective barrier between the operator and rotatably driven tines.

From the foregoing, it can be seen that the tilling machine of the present invention is adapted for easier and safer usage. The tilling machine further operates with improved power efficiency, can be readily and effectively operated in various adverse soil and vegetation conditions, and is capable of tilling and thoroughly pulverizing earth to a greater depth in a single pass than heretofore possible with usual power limitations of walk-behind type tillers.

What is claimed is:

1. A walk-behind garden tiller comprising, in combination, a frame, ground-engaging drive wheels mounted adjacent one end of the frame, a tine drive shaft extending transversely to and journalled in a position adjacent to the other end of the frame, an engine mounted on said frame, a wheel drive train for coupling the engine to the drive wheels to drive the tiller in the forward direction, a rearwardly projecting handle secured to the frame for manual guidance of the tiller, a tine drive train for coupling the engine to the tine drive shaft, said tine drive shaft having a set of ground-engaging tines secured thereto, the tine drive train being so directioned that the tine shaft revolves counter to the direction of the drive wheels during tilling with the tines cutting upwardly through the untilled soil at the working face, a tine shield overlying said tines for confining flying and turbulent soil during tilling to the area about said tines, said tine shield including an extension located forwardly of said tines for blocking soil directed upwardly and forwardly by said counter-rotating tines and for defining an extended cavity in front of said tines within which a quantity of partially tilled soil can accumulate for reworking and more thorough pulverization by said tines as said machine proceeds forwardly, said tine shield extension extending forwardly of the front periphery of said tines a distance at least equal to about one-half the diameter of said tines, said tine shield extension extending downwardly to a level that is above the level of said tine drive shaft.

2. The tiller of claim 1 in which said tine shield extension terminates in a downwardly inclined forwardmost lip for directing soil impinging upon said tine extension during tilling in a generally downwardly and forwardly direction.

3. The tiller of claim 2 in which said lip is inclined at an angle of about 60° to the horizontal.

4. The tiller of claim 2 in which said tine shield extension includes a generally horizontally disposed top panel that terminates in said forwardly and downwardly directed lip.

5. The tiller of claim 4 in which said tine shield extension top panel is disposed at an elevation which is about the level of the top periphery of said tines.

6. The tiller of claim 1 in which said tine shield extension extends downwardly to a level that is about one-third the diameter of the tines below the top peripheral level of said tines.

7. The tiller of claim 6 in which said ground wheels are disposed in front of said tines, and said tine shield extension extends downwardly to approximately the level of the axle of said ground wheels.

8. The tiller of claim 6 in which said tine shield extension has a lowermost leading edge lying in a plane that is tangent to the outer periphery of said tines and at an angle of between about 40° and about 55° to the horizontal.

9. The tiller of claim 6 in which said tine shield extension has a lowermost leading edge lying in a plane that is tangent to the outer periphery of said tines and is at angle of about 40° to the horizontal.

10. The tiller of claim 1 in which said tine shield has a stepped configuration including a first generally horizontally disposed top panel located above said tines, a second generally horizontally disposed top panel forming a part of said shield extension and located below the level of said first top panel.

11. The tiller of claim 10 including a first inclined panel connecting said first and second horizontal panels, and a downwardly and forwardly directed lip extending forwardly from said second horizontal tine shield panel, and a rearwardly and downwardly directed lip extending rearwardly from said first horizontal tine shield panel.

12. The tiller of claim 11 in which said downwardly and forwardly directed lip is inclined at an angle of about 60° to the horizontal.

* * * * *